(12) United States Patent
Mayer et al.

(10) Patent No.: US 6,813,944 B2
(45) Date of Patent: Nov. 9, 2004

(54) FLOW SENSOR

(75) Inventors: Felix Mayer, Zürich (CH); Mark Rainer Hornung, Zürich (CH); Ralph Steiner Vanna, Zürich (CH)

(73) Assignee: Sensirion AG, Zurich (CH)

( * ) Notice: Subject to any disclaimer, the term of this patent is extended or adjusted under 35 U.S.C. 154(b) by 0 days.

(21) Appl. No.: 10/258,307

(22) PCT Filed: Apr. 23, 2001

(86) PCT No.: PCT/IB01/00667
§ 371 (c)(1),
(2), (4) Date: Oct. 23, 2002

(87) PCT Pub. No.: WO01/84087
PCT Pub. Date: Nov. 8, 2001

(65) Prior Publication Data
US 2003/0049877 A1 Mar. 13, 2003

(30) Foreign Application Priority Data

| May 4, 2000 | (CH) | ................................. 871/00 |
| Jun. 13, 2000 | (CH) | ............................... 1160/00 |

(51) Int. Cl.[7] ................................. G01F 1/68
(52) U.S. Cl. .................................. 73/204.26
(58) Field of Search ................... 73/204.26, 204.22, 73/204.25, 204.18, 204.16, 204.19, 204.27, 204.11; 438/57; 340/603

(56) References Cited

U.S. PATENT DOCUMENTS

| 3,881,181 A | | 4/1975 | Khajezadeh | ................. 357/69 |
| 4,255,968 A | * | 3/1981 | Harpster | .................. 73/204.18 |
| RE31,906 E | * | 6/1985 | Oyama et al. | ......... 364/431.06 |
| 4,587,843 A | | 5/1986 | Tokura et al. | ................ 73/204 |
| 4,680,963 A | | 7/1987 | Tabata et al. | ................. 73/204 |
| 5,081,866 A | | 1/1992 | Ochiai et al. | ............ 73/204.21 |
| 5,228,329 A | * | 7/1993 | Dennison | ..................... 73/49.1 |
| 5,230,245 A | * | 7/1993 | Kamiunten et al. | ........... 73/195 |
| 5,233,868 A | * | 8/1993 | Coats et al. | ............. 73/204.18 |
| 5,396,795 A | | 3/1995 | Araki | ...................... 73/204.26 |
| 5,398,549 A | | 3/1995 | Suzuki | ..................... 73/204.26 |
| 5,705,745 A | | 1/1998 | Treutler et al. | .......... 73/204.26 |
| 5,830,372 A | | 11/1998 | Hierold | .......................... 216/2 |
| 6,579,740 B2 | * | 6/2003 | Toyoda | ......................... 438/57 |
| 6,604,417 B1 | * | 8/2003 | Koike et al. | ............. 73/204.22 |
| 6,615,655 B1 | * | 9/2003 | Sakai et al. | .............. 73/204.26 |
| 6,628,202 B2 | * | 9/2003 | McQueen et al. | .......... 340/603 |
| 6,672,154 B1 | * | 1/2004 | Yamagishi et al. | ...... 73/204.22 |

FOREIGN PATENT DOCUMENTS

| DE | 3006584 | 9/1981 | ............. G01F/1/68 |
| DE | 19511687 | 10/1996 | ........... G01F/1/684 |
| GB | 1035324 | 7/1996 | |

OTHER PUBLICATIONS

Khalil Najafi, "Silicon Integrated Microsensors," Integrated Optics and Microstructures Sep. 8, 1992, SPIE vol. 1793, pp. 235–246.

* cited by examiner

*Primary Examiner*—Edward Lefkowitz
*Assistant Examiner*—Jewel V. Thompson
(74) *Attorney, Agent, or Firm*—Cooper & Dunham LLP; Donald S. Dowden

(57) ABSTRACT

The flow sensor comprises a semiconductor device (1) on which a heat source and, symmetrically thereto, two temperature sensors are arranged. The semiconductor device (1) is arranged on an exterior side of a tube section (2), and a liquid, the flow velocity of which has to be measured, is led through the tube section (2). The temperature sensors and the heat source are in thermal contact with the exterior side of the tube section (2). It has been found that such an assembly allows to carry out flow measurements with high accuracy and sensitivity.

23 Claims, 3 Drawing Sheets

FLOW SENSOR

CROSS REFERENCE TO RELATED APPLICATIONS

This application claims the priority of the Swiss applications 0871/00 and 1160/00, filed May 4 and Jun. 13 2002, respectively, and the disclosure of which is incorporated herein by reference in its entirety.

BACKGROUND

The invention relates to a flow sensor for a liquid as well as to a method for its production.

STATE OF THE ART

It has been known to measure the flow velocity and the mass flow, respectively, of a fluid with a semiconductor device, on which a heat source and at least one temperature sensor are arranged. The flow leads to a change of the temperature distribution of the heat source, which can be measured by means of the temperature sensor or temperature sensors.

Semiconductor devices of this type are, however, sensitive. In contact with liquids, an undesired diffusion of substances affecting the properties of the device occurs easily. Furthermore, mechanical strain can damage the device. Hence, the semiconductor devices have to be protected in complicated manner, e.g. by protection layers.

SUMMARY OF THE INVENTION

Hence it is an object to provide a flow sensor of the type mentioned initially that can measure a plurality of different liquids, that is robust and that can be manufactures easily.

This object is achieved by the flow sensor of the invention.

Hence, according to the invention the semiconductor device is arranged on an exterior side of a tube section, namely in such a manner that it is in thermal contact with this exterior side. Surprisingly it has been found that such an arrangement still allows accurate and sensitive measurements. As the liquid is guided in the tube section and does not come into contact with the semiconductor device and its passivation layers, respectively, damages can be avoided.

The semiconductor device can e.g. be in direct thermal contact with the exterior side of the tube, or it can be connected thereto via heat conducting elements, e.g. of a metal. It is also possible to arrange an adhesive layer, e.g. of a solder, between the tube section and the semiconductor device, or thermally conducting paste can be used.

The tube section can e.g. be of glass or metal, wherein metal is preferred because of its high thermal conductivity. Other materials, such as plastic, can, however, also be used.

The tube section can be made of a single part or of several individual tube parts.

In order to guarantee a better heat contact, the exterior side of the tube can also be designed to be flattened in the region of the semiconductor device and/or the tube can have a thinned wall region.

BRIEF DESCRIPTION OF THE DRAWINGS

Further embodiments, advantages and applications of the invention can be understood from the now following description referring to the figures, wherein.

WAYS FOR CARRYING OUT THE INVENTION

Figure 1:
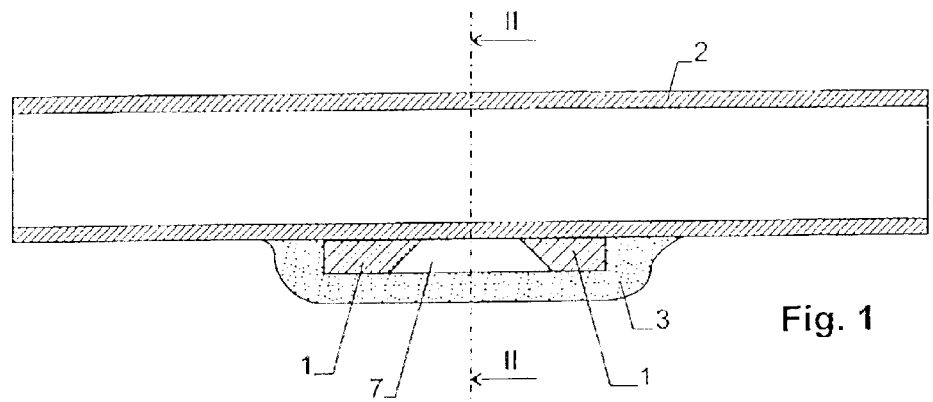
FIG. 1 shows a sectional view of a first embodiment of the flow sensor.
Figure 2:
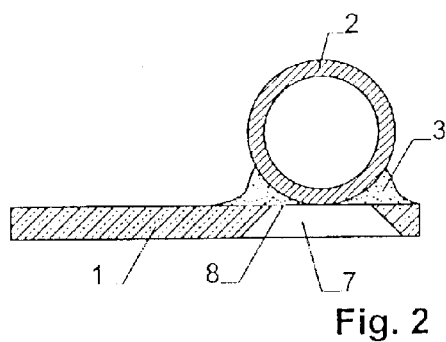
FIG. 2 shows a sectional view along line II—II of FIG. 1.
Figures 3, 10:
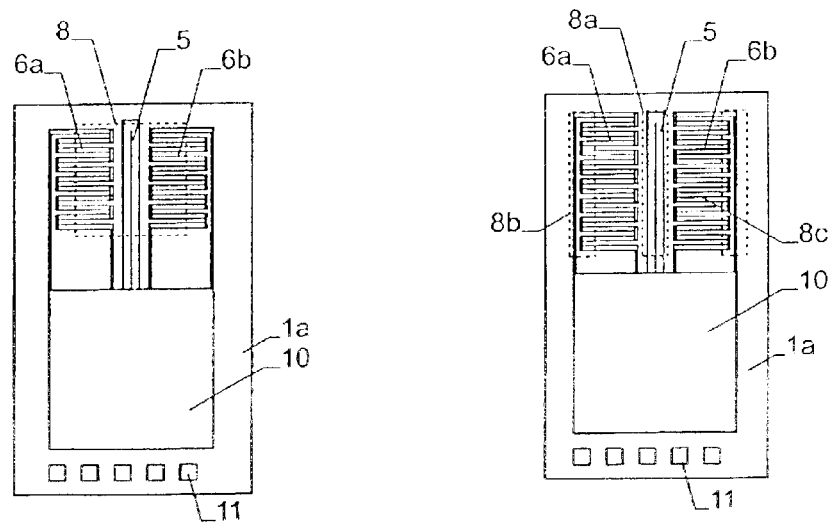
FIG. 3 is a top view of the semiconductor device of the flow sensor.
FIG. 10 is a top view of a second embodiment of the flow sensor.

The basic design of the flow sensor results from the first embodiment illustrated in FIGS. 1-3. It consists of a semiconductor device 1, which is arranged at the exterior side of a tube section 2, through which the liquid to be measured is flowing. For affixing semiconductor device 1 to tube section 2, a hardened adhesive mass 3 is provided in this embodiment.

As it can especially be seen from FIG. 3, semiconductor device 1 consists of a substrate 1a, on which a heat source 5 in the shape of an integrated resistor is arranged. Before and after heat source 5, as seen in flow direction, two temperature sensors 6a, 6b are provided. In the present preferred embodiment the temperature sensors are designed as thermopiles.

An opening 7 is etched out of substrate 4, which opening is covered by a thin dielectric membrane 8. The heat source 5 as well as the heat source side contact rows of the thermopiles 6a, 6b are located on membrane 8. By means of this arrangement the thermal conductivity between heat source 5 and the temperature sensors is reduced.

Heat source 5 and the thermopiles 6a, 6b are provided on their top side with a dielectric passivation layer (now shown), e.g. of silicon oxide or silicon nitride.

Heat source 5 and at least the inner contact rows of the thermopiles 6a, 6b or their passivation layer, respectively, are in thermal contact with the exterior side of tube 2. They can touch the exterior side of the tube directly, or they can be separated from the same by a thin layer of adhesive material, thermally conducting paste or solder.

Furthermore, processing electronics 10 are arranged on substrate 4. These comprise e.g. an amplifier, an analog-digital-converter and a digital processing stage, e.g. for linearizing and scaling the signal from the thermopiles, as well as a control for the heat source. For an electrical connection with the outside world, contact pads 11 are provided.

Processing electronics 10 are designed to operate heat source 5 with constant current, constant temperature or constant voltage. Furthermore, they measure the difference $\Delta$ of the temperature differences over the thermopiles 6a, 6b. As the exterior contact rows of the thermopiles 6a, 6b are substantially at the same temperature, the difference $\Delta$ corresponds substantially to the temperature difference at the inner contact rows.

In operation, heat source 5 generates a heat distribution in the wall of tube 2. Due to the flow of the liquid in tube 2, this temperature difference becomes asymmetric such that the difference Δ of the temperature differences is a measure of the flow velocity.

Tube 2 is manufactured independently of semiconductor device 1 and it is self supporting. It consists preferably of metal and has a wall thickness of, if possible, less than 0.5 mm such that a good sensitivity is achieved. It is found, however, that tube sections with thicker walls can be used as well thanks to the high sensitivity of the semiconductor device.

It is also possible to use tubes of glass or plastic.

Figure 4:
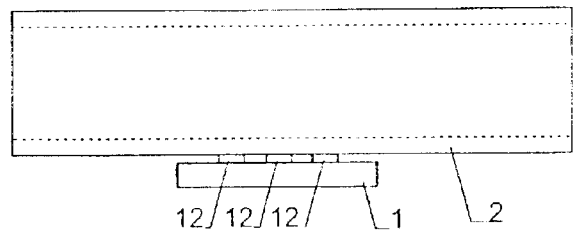
FIG. 4 is a side view of a flow sensor with heat conducting elements.

A second embodiment of the invention is illustrated in FIG. 4. Here, semiconductor device 1 is not directly abutting against the exterior side of tube section 2. Rather, three heat conducting elements 12 are arranged between semiconductor device 1 and tube 2. They can e.g. be "metal bumps", i.e. projections of metal, preferably gold or copper, which lie on top of the inner contact rows of the thermopiles 6a, 6b and heating 5 and form a thermal contact with each of them. The arrangement of FIG. 4 has the advantage that the semiconductor device 1 is in thermal contact with tube section 2 at well defined places only.

The semiconductor device of FIG. 4 can, as the one according to FIG. 1, also be covered by an adhesive mass.

Figure 5:
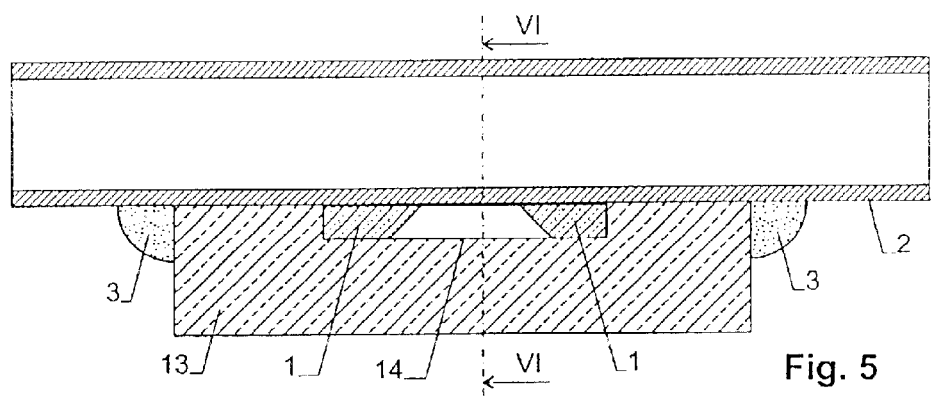
FIG. 5 is a sectional view of a third embodiment of the flow sensor.
Figure 6:
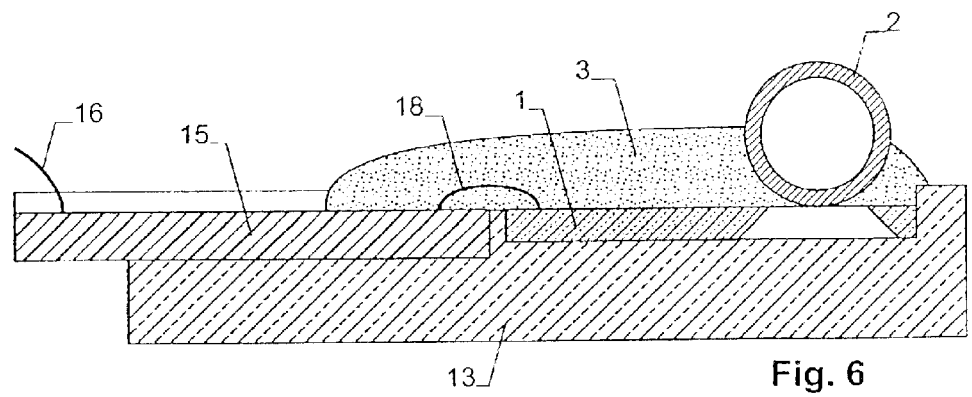
FIG. 6 is a sectional view along line VI—VI of FIG. 5.

FIGS. 5 and 6 show a further embodiment of the invention, where semiconductor device 1 is protected by a housing 13. Housing 13 consists preferably of plastics and possesses e.g. a suited recess for receiving semiconductor device 1. Semiconductor device 1 is connected to a printed circuit 15 via bond wires 18. Printed circuit 15 serves for mounting connecting wires 16 and is mechanically connected to housing 13 such that forces exerted on the connecting wires 16 cannot be directly transmitted to semiconductor device 1.

For covering semiconductor device 1 and for attaching housing 13 to tube 2, again a glue 3 is provided.

In the above examples, tube section 2 has a cylindrical exterior surface. In order to achieve a very good heat transition between semiconductor device 1 and tube section 2, the exterior surface of tube section 2 is preferably designed flattened in the region of semiconductor device 1.

Figure 7:
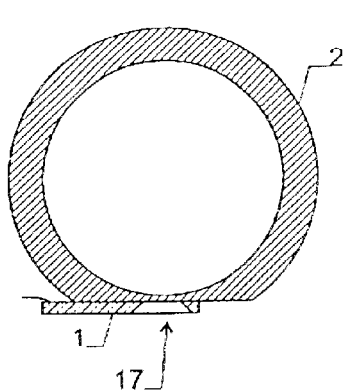
FIG. 7 is a sectional view of a fourth embodiment of the flow sensor.
Figure 8:
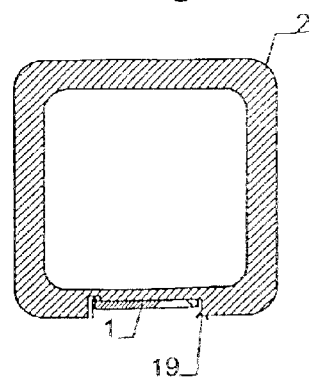
FIG. 8 is a sectional view of a firth embodiment of the flow sensor.

Two corresponding embodiments are shown in FIGS. 7 and 8.

In the example of FIG. 7 tube section 2 is cylindrical but has been flatted in a region 17.

In FIG. 8 tube section 2 is substantially rectangular and comprises a recess 19, where semiconductor device 1 is located. In the region of recess 19 tube section 2 has a thinner wall thickness than at the remaining walls. By means of this arrangement semiconductor device 1 is better protected and the heat resistance of the wall of tube section 2 is smaller. With other words, tube section 2 has wall regions of differing thickness, wherein semiconductor device 1 is arranged at the wall region that has the smallest thickness.

In the embodiments shown so far, tube 2 is shown to be made of one piece, i.e. the cross section of the tube in the region of the sensor is formed by a single piece. Tube 2 can, however, also be made from several pieces such that the walls forming the cross section of the tube are formed by several pieces.

Figure 9:
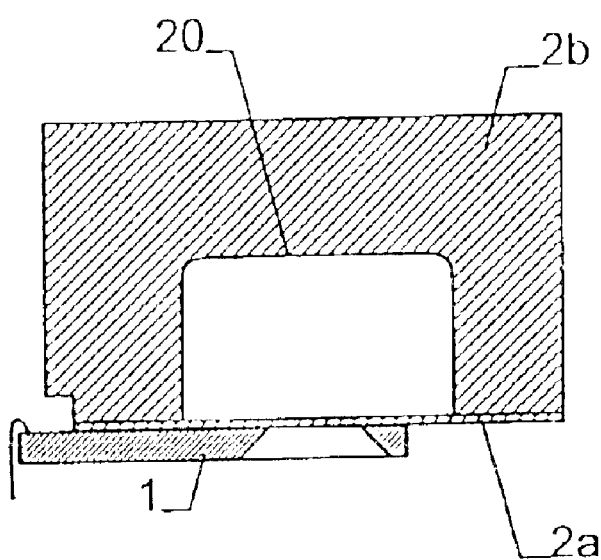
FIG. 9 is a sectional view of a sixth embodiment of the flow sensor.

A corresponding embodiment is shown in FIG. 9. Here, tube 2 is formed by a first tube part 2a and a second tube part 2b. Tube part 2b consists of a block of material with a recess or groove 20. Tube part 2a has the shape of a thin plate or foil and extends over groove 20. Semiconductor device 1 is in thermal contact with tube part 2a and is arranged on its exterior surface.

In this embodiment, tube section 2a forms therefore one wall of tube 2 and separates the tube's interior from semiconductor device 1.

The embodiment of FIG. 9 has several advantages. In particular, tube part 2a can be manufactured separately from tube part 2b. This allows to manufacture tube part 2a as a plate or foil with a very well defined thickness. Since tube part 2a is manufactured separately, it has to be self supporting.

After manufacturing, tube part 2a can be sealingly connected to tube part 2b, e.g. by gluing or welding. Semiconductor device 1, which has been manufactured independently from tube part 2a, is attached to tube part 2a before or after tube parts 2a and 2b have been connected.

Preferably, tube part 2a is of a polymer, such as PEEK (Polyetheretherketone), Teflon Polyaryl-Sulfon (PSU) or Polyimid. Its thickness is given by the desired mechanical stability and heat conductivity. In order to be self supporting, it should, however, have a thickness of at least 10 $\mu$m, preferably of at least 25 $\mu$m.

A further advantage of the embodiment of FIG. 9 lies in the fact that the interior of the tube is accessible during manufacturing and can therefore be partially or completely coated easily, e.g. by a hardening, anti-adhesive and/or passivating coating, e.g. DLC (Diamond Like Carbon). Tube part 2a as well as tube part 2b can be coated.

An additional advantage of separately manufacturing several tube parts 2a, 2b lies in the fact that tube part 2a, which separates semiconductor device from the interior of the tube, can be specifically selected in view of a desired measuring range or measured fluid.

In addition to this, using several tube parts allows to use different materials, such that tube part 2a can be of plastics and tube part 2b of a metal.

In the embodiment of FIG. 9 this means e.g. that different plates or foils of differing thickness can be provided as tube parts 2a. Depending on the measuring range and/or from the fluid to be measured, the thickness is selected that allows to fully exploit the dynamics of semiconductor device 1 and to adapt the measuring range.

In the above embodiments, symmetrically designed sensor arrangements with two temperature sensors 6a, 6b are used. It is, however, also possible to use only one temperature sensor, but a design with two temperature sensors has higher sensitivity and accuracy.

In the embodiment of FIG. 3 of semiconductor device 1, an opening 7 and a membrane 8 are provided, on which the heating 5 as well as the inner contacts of the thermopiles 6a, 6b are lying. An alternative embodiment is illustrated in FIG. 10. Here, three openings are provided in semiconductor device 1, the central one of which lies below heating 5 and the exterior ones lie below the exterior contact rows of the thermopiles 6a, 6b, and each which is covered by a membrane 8a, 8b and 8c. This architecture also shows a good thermal isolation between the temperature sensors and the heating.

It is also possible to dispense with the openings and membranes in the semiconductor device and to arrange the heating as well as the contact rows of the thermopiles over the bulk substrate. This reduces the sensitivity of the device but increases its mechanical stability.

During production of the sensor, semiconductor device 1 and tube section 2 or the two separate tube parts 2, 2*b* are manufactured separately. Then, the parts are assembled. In the embodiment of FIG. 9 either the two tube parts 2*a*, 2*b* can be connected to each other first, or it is also possible to connect tube section 2*a* after is production first to semiconductor device 1 and only then to connect semiconductor device 1 with the first tube part 2*a* to the second tube part.

While in the present application preferred embodiments of the invention are described, it is to be distinctly pointed out that the invention is not limited thereto and can also be carried out in different manner within the scope of the following claims.

What is claimed is:

1. Flow sensor for a liquid comprising a semiconductor device on which at least one temperature sensor and a heat source are integrated and a tube section for guiding the liquid, wherein the semiconductor device is arranged at an exterior side of the tube section and wherein the temperature sensor and the heat source are in thermal contact with the exterior side of the tube section.

2. Flow sensor of claim 1 wherein the at least one temperature sensor and the heat source are in direct contact with the exterior side of the tube section.

3. Flow sensor of claim 1 wherein the at least one temperature sensor and the heat source are in contact with the exterior side of the tube section via heat conducting elements.

4. Flow sensor of claim 1 wherein an adhesive layer is arranged between the semiconductor device and the tube section.

5. Flow sensor of claim 4 wherein the adhesive layer is a hardened solder.

6. Flow sensor of claim 1 further comprising thermally conductive paste arranged between the semiconductor device and the tube section.

7. Flow sensor of claim 1 wherein the semiconductor device is glued to the tube section.

8. Flow sensor of claim 1 wherein the tube section is of a metal.

9. Flow sensor of claim 1 further comprising at least one recess or opening arranged in the semiconductor device and a membrane arranged above said opening, wherein the at least one temperature sensor and the heat source are arranged on the membrane.

10. Flow sensor claim 1 wherein two temperature sensors are arranged on the semiconductor device and wherein the heat source is arranged between the temperature sensors.

11. Flow sensor of claim 1 wherein the exterior side of the tube section is flattened in a region of the semiconductor device.

12. Flow sensor of claim 1 wherein the tube section comprises a recess on its exterior side, in which recess the semiconductor device is arranged.

13. Flow sensor of claim 1 wherein the tube section is of a single piece.

14. Flow sensor of claim 1 wherein the tube section consists of several tube parts, wherein the semiconductor device is in thermal contact with a first one of the tube parts.

15. Flow sensor for a liquid comprising a semiconductor device on which at least one temperature sensor and a heat source are integrated, and a tube section for guiding the liquid, wherein the semiconductor device is arranged at an exterior side of the tube section and wherein the temperature sensor and the heat source are in thermal contact with the exterior side of the tube section, wherein the tube section consists of several tube parts, wherein the semiconductor device is in thermal contact with a first one of the tube parts, and wherein the first tube part has the shape of a plate or foil and extends over a recess.

16. Flow sensor of claim 15 wherein the first tube section is self-supporting and has a thickness of at least 10 $\mu$m.

17. Flow sensor of claim 15 wherein the first tube section is of a plastic.

18. Flow sensor of claim 1 wherein the tube section comprises wall regions of differing thickness, wherein the semiconductor device is arranged at a wall region of minimum thickness.

19. Flow sensor of claim 3 wherein the heat conducting elements are of a metal.

20. Flow sensor of claim 8 wherein said tube section has a wall thickness of at most 0.5 mm.

21. Flow sensor of claim 1 further comprising processing electronics for signals from the temperature sensor or the temperature sensors, respectively, are arranged on the semiconductor device.

22. Flow sensor of claim 15 wherein the first tube section has a thickness of at least 25 $\mu$m.

23. A flow sensor for a liquid comprising:

a tube section for guiding the liquid;

a semiconductor device;

at least one temperature sensor integrated on the semiconductor device;

a heat source integrated on the semiconductor device;

heat conducting metal bumps arranged on said substrate, a metal bump lying on each temperature sensor and a metal bump lying on the heat source, wherein the at least one temperature sensor and the heat source are in contact with the exterior side of the tube section via the heat conducting metal bumps.

* * * * *